United States Patent [19]

Fung

[11] 4,359,406
[45] Nov. 16, 1982

[54] HIGHLY DISPERSED SUPPORTED GROUP VIII METAL-PHOSPHORUS COMPOUNDS, AND HIGHLY DISPERSED, SUPPORTED GROUP VIII METAL-ARSENIC AND A PROCESS FOR MAKING SAID COMPOUNDS

[75] Inventor: Shun C. Fung, Edison, N.J.

[73] Assignee: Exxon Research and Engineering Co., Florham Park, N.J.

[21] Appl. No.: 807,519

[22] Filed: Jun. 17, 1977

[51] Int. Cl.$^3$ .................. B01J 27/14; B01J 27/24; H01M 4/88; B01J 23/40
[52] U.S. Cl. ................... 252/437; 252/435; 252/438; 252/425.3; 252/472; 252/447; 252/464; 252/456; 252/455 R; 252/455 Z; 429/40; 429/44
[58] Field of Search ............ 252/435, 437, 438, 425.3, 252/472, 447, 464, 456, 455 R, 455 Z; 429/40, 44

[56] References Cited

U.S. PATENT DOCUMENTS

| | | | |
|---|---|---|---|
| 2,890,167 | 6/1959 | Haensel | 252/435 X |
| 2,983,997 | 5/1961 | Schmeckenbecher | 252/472 X |
| 3,179,694 | 4/1965 | Eygen et al. | 252/472 X |
| 3,236,693 | 2/1966 | Caesar | 429/44 X |
| 3,411,953 | 11/1968 | Larson et al. | 252/425.3 |
| 3,448,165 | 6/1969 | Bloch | 252/464 X |
| 3,449,169 | 6/1969 | Rhodes | 136/86 |
| 3,784,483 | 1/1974 | Eichowski | 252/437 |
| 3,792,086 | 2/1974 | Frank et al. | 252/435 X |
| 3,884,798 | 5/1975 | Hilfman | 252/437 X |
| 3,961,987 | 6/1976 | Mund et al. | 429/44 |

FOREIGN PATENT DOCUMENTS 1418943 12/1975 United Kingdom.

*Primary Examiner*—Delbert E. Gantz
*Assistant Examiner*—William G. Wright
*Attorney, Agent, or Firm*—Ernest A. Forzano; Edward M. Corcoran

[57] ABSTRACT

The instant invention relates to novel compositions comprising highly dispersed Group VIII metal-phosphorus compounds or Group VIII metal-arsenic compounds supported on a high surface area solid support selected from the group consisting of carbon, alumina, silica, silica-alumina, zeolite, kieselguhr, vermiculite, and the refractory oxides of Group IVb and Vb, transition metals, and mixtures thereof.

The instant invention further relates to a method for the preparation of the above compositions. In the preparation of the supported Group VIII metal-phosphorus compounds, the support is impregnated with both a phosphorus source, e.g. elemental phosphorus or a water soluble phosphorus salt, and a Group VIII metal source. The Group VIII metal source is impregnated onto the support from a solution of a water soluble Group VIII metal salt. Reduction of the resultant impregnated composition at temperatures above about 200° C. results in the formation of highly dispersed, supported Group VIII metal-phosphorus compounds. The preparation of the highly dispersed supported Group VIII metal-arsenic compounds is accomplished in a similar manner. The Group VIII metal loading of these compositions range from about 0.1% to about 30 wt. % of the total catalyst. The phosphorus to Group VIII metal atomic ratio or the arsenic to Group VIII metal atomic ratio ranges from 0.3 to 3.0.

The highly dispersed supported Group VIII metal-phosphorus compounds or Group VIII metal-arsenic compounds may be used to form highly dispersed, supported Group VIII metal catalysts after low temperature air calcination or decomposition in water at room temperature.

44 Claims, No Drawings

HIGHLY DISPERSED SUPPORTED GROUP VIII METAL-PHOSPHORUS COMPOUNDS, AND HIGHLY DISPERSED, SUPPORTED GROUP VIII METAL-ARSENIC AND A PROCESS FOR MAKING SAID COMPOUNDS

BRIEF DESCRIPTION OF THE INVENTION

The instant invention relates to novel compositions comprising highly dispersed Group VIII metal-phosphorus compounds or Group VIII metal-arsenic compounds supported on a high surface area solid support selected from the group consisting of carbon, alumina, silica, silica-alumina, zeolite, kieselguhr, vermiculite, and the refractory oxides of Group IVb and Vb, transition metals, and mixtures thereof.

The instant invention further relates to a method for the preparation of the above compositions. In the preparation of the supported Group VIII metal-phosphorus compounds, the support is impregnated with both a phosphorus source, e.g. elemental phosphorus or a water soluble phosphorus salt, and a Group VIII metal source. The Group VIII metal source is impregnated onto the support from a solution of a water soluble Group VIII metal salt. Reduction of the resultant impregnated composition at temperatures above about 200° C. results in the formation of highly dispersed, supported Group VIII metal-phosphorus compounds. The preparation of the highly dispersed supported Group VIII metal-arsenic compounds is accomplished in a similar manner. The Group VIII metal loading of these compositions range from about 0.1% to about 30 wt. % of the total catalyst. The phosphorus to Group VIII metal atomic ratio or the arsenic to Group VIII metal atomic ratio ranges from 0.3 to 3.0.

The highly dispersed supported Group VIII metal-phosphorus compounds or Group VIII metal-arsenic compounds may be used to form highly dispersed, supported Group VIII metal catalysts after low temperature air calcination or decomposition in water at room temperature.

The supported Group VIII metal-phosphorus compositions of the instant invention are known to be useful in the selective hydrogenation of liquid hydrocarbons such as diolefins, resins and asphalts. The increase in dispersion of such supported Group VIII metal-phosphorus compounds increases their activity over their corresponding bulk phase catalysts. The increase in dispersion of the Group VIII metal catalysts formed from the Group VIII metal-phosphorus or Group VIII metal-arsenic intermediates also increases their activity over their corresponding bulk phase catalysts. It should be further noted that the highly dispersed supported Group VIII metal-phosphorus or Group VIII metal-arsenic compounds may be utilized as electrodes in electrochemical fuel cells.

DESCRIPTION OF THE PRIOR ART

The processes of the prior art have been unable to produce supported Group VIII-phosphorus compounds or Group VIII-arsenic compounds as highly dispersed as generated by the process of the instant invention.

British Pat. No. 1,418,943, and U.S. Pat. No. 3,449,169, Rhodes, describe dispersion techniques typical of the prior art.

U.S. Pat. No. 3,449,169 describes the preparation of bulk platinum phosphide. The process comprises physically combining phosphorus powder, platinum powder and aluminum powder in an inert atmosphere under a temperature in the range of 650° C. to 1000° C., usually 750° C. to 900° C., for 24 to 72 hours. Although it is possible to start out with Pt black particles of from 50 Å–100 Å, the Pt particles would sinter to much larger particles greater than 1000 Å during the heat treatment. The only means of increasing the platinum phosphide used in this method is the leaching of the aluminum phosphide with sulfuric acid. This leaching step should only slightly increase the surface area of the $PtP_2$ compound. The instant process, on the other hand, deposits the water soluble Group VIII metal salts onto supports. This technique permits the deposition of Group VIII metals with a crystallite size much smaller than that encountered above. For example, utilization of the incipient wetness technique for a water soluble platinum-chloride complex results, after reduction of the deposited platinum complex, in the deposition of Pt particles under 25 Å. This is quite a bit smaller than the Pt particles encountered after sintering as in U.S. Pat. No. 3,449,169. Since, all other things being equal, the larger the metal crystallite size, the larger the corresponding metal phosphide compound formed from that metal, the smaller metal crystallite sizes prepared by the instant process are quite significant. It should also be pointed out that the $PtP_2$ particles formed by the process described in U.S. Pat. No. 3,449,169 were not disturbed by sulfuric acid leaching. The high surface area supported $PtP_2$ composition of the instant invention is not stable in such a medium—the $PtP_2$ decomposes to Pt crystallites. This is primarily due to the high surface area of our $PtP_2$ over the $PtP_2$ produced by U.S. Pat. No. 3,449,169. Further, although U.S. Pat. No. 3,449,169, on column 1, lines 46–48, describes the $PtP_2$ crystals formed by that method to range from about 100 to 2000 Å, the surface area as determined by a krypton absorption apparatus, reported on column 1, lines 49–53, corresponds to a $PtP_2$ crystallite size of at least 1000 Å.

British Pat. No. 1,418,943 also describes metal phosphide preparation techniques. It presents two basic phosphide preparation techniques. One method is similar to the process discussed in U.S. Pat. No. 3,449,169. In this method a metal powder, phosphorus powder and an inert solid support powder are heated at elevated temperatures. Like the physical mixture formed by the method in U.S. Pat. No. 3,449,169, the method described in the British patent forms only a physical mixture with limited dispersion on support materials. The inert support may be leached out to increase the surface area of the metal phosphides formed by the process. However, just as with U.S. Pat. No. 3,449,169, the utilization of powdered metals and powdered phosphorus, without the deposition of small metal crystallites on an inert support, will lead to sintering and increased metal particle size (over 1000 Å) when heated at elevated temperatures.

The other process for forming metal phosphides comprises the precipitation of metal-pyrophosphates from solution. First, a solution is formed containing a soluble pyrophosphate and an inert solid powder, such as carbon. A metal salt solution is added which causes the precipitation of a metal-pyrophosphate in the presence of the inert powder suspended in the solution. It is believed that only a minimal amount of metal-pyrophosphate will be impregnated upon the solid support suspended in the solution. This method will also result in a physical mixture, i.e. separate discrete particles mixed together, rather than an impregnation of one component onto another. Without this impregnation, the size of the metal component will be much larger, leading to metal phosphide compounds of lower dispersion. The instant invention requires the impregnation of a water soluble metal salt onto a solid support material. This insures that the metal component will have a very small crystallite size, e.g. 25 Å or less, which will lead to correspondingly small support metal phosphide compounds of high dispersion.

DETAILED DESCRIPTION OF THE INVENTION

The instant invention relates to novel compositions and their preparation, said compositions comprising highly dispersed Group VIII metal-phosphorus compounds or Group VIII metal-arsenic compounds supported on a high surface area solid support selected from the group consisting of carbon, alumina, silica, silica-alumina, zeolite, kieselguhr, vermiculite and the refractory oxides of Group IVb and Vb, transition metals and mixtures thereof.

The metals chosen from the Group VIII metals of the Periodic Table of the Elements, or mixtures thereof, namely, Fe, Co, Ni, Ru, Rh, Pd, Os, Ir and Pt; preferably the Group VIII noble metals, namely Ru, Rh, Pd, Os, Ir, Pt and mixtures thereof; most preferably, Pt. The metal loading of the Group VIII metal component in the compositions of the instant invention range from about 0.1% to about 30% by weight of the total catalyst, preferably from about 1% to about 20% by weight of the total catalyst.

The non-metallic component of the Group VIII metal-phosphorus compound or Group VIII metal-arsenic compound, supported on the supports enumerated above, comprises either phosphorus or arsenic, preferably phosphorus. The highly dispersed, supported Group VIII metal-phosphorus compounds of the instant invention are binary compounds, that is, these compounds contain two components, a Group VIII metal and phosphorus. As is well known to those in the art, there is a wide variety of Group VIII metal-phosphorus binary compounds. The compositions of the instant invention include any of the known Group VIII metal-phosphorus compounds or mixtures thereof, on the supports named above. As is known to those in the art, the ratio of phosphorus to Group VIII metal component in these intermetallic compounds depends upon the Group VIII metal component present in the compound in question. For example Ni has Ni-P compounds ranging from $Ni_3P$ to $NiP_3$. Os, on the other hand, has only $OsP_2$. Thus, for the compositions of the instant invention the range of phosphorus to Group VIII metal atomic ratio may range, depending upon the Group VIII metal component, from about 0.3 to about 3.0, more preferably above about 1.0, most preferably above about 2.0. A most preferable Group VIII metal-phosphorus compound is $PtP_2$.

Similarly, highly dispersed, supported Group VIII metal-arsenic compounds are binary compounds of a Group VIII metal component and an arsenic component. The compositions of the instant invention include any of the known Group VIII metal-arsenic intermetallic compounds, or mixtures thereof, on the supports named above. The range of arsenic to Group VIII metal atomic ratio may also range from about 0.3 to about 3.0, more preferably above about 1.0, most preferably, above about 2.0.

The supports of the instant compositions are selected from the group consisting of a high surface area solid support selected from the group consisting of carbon, alumina, silica, silica-alumina, zeolite, kieselguhr, vermiculite and the refractory oxides of Group IVb and Vb of the Periodic Table of the Elements, and mixtures thereof. Preferably, the supports are selected from the group consisting of carbon, silica, alumina, silica-alumina and mixtures thereof. Most preferably, the support is carbon. The carbon support may be crystalline, i.e. graphite, or amorphous, preferably amorphous. Further, the carbon support may be activated or nonactivated, preferably activated.

As described above, the supported Group VIII metal-phosphorus compounds or Group VIII metal-arsenic compounds may be distinguished from those compositions of the prior art in that the compositions are highly dispersed upon the high surface area supports named above. This novel, high degree of dispersion has been unexpectedly achieved considering the state of the art. The crystallite size of the supported Group VIII metal-phosphorus compounds are preferably under about 300 Å, and most preferably under about 100 Å, most preferably under 50 Å. Likewise, the crystallite sizes of the supported Group VIII metal-arsenic compounds are preferably under 300 Å, preferably under 100 Å and most preferably under 50 Å.

The compositions of the instant invention, in particular, the supported Group VIII-phosphorus compounds, are known to be useful in the selective hydrogenation of liquid hydrocarbons, such as diolefins, resins and asphalts. The increase in dispersion of such supported Group VIII metal-phosphorus compounds increases their activity over their corresponding bulk phase catalysts. It has also been unexpectedly discovered that these supported Group VIII metal-phosphorus compounds and supported Group VIII metal-arsenic compounds are useful as intermediates in the generation of the corresponding highly dispersed supported Group VIII metal catalyst. It should be further noted that the highly dispersed, supported Group VIII metal-phosphorus or Group VIII metal-arsenic compounds may be utilized as electrodes in electrochemical fuel cells.

It has been unexpectedly discovered that the methods of preparation described herein produce the highly dispersed supported Group VIII metal-phosphorus or Group VIII metal-arsenic compounds described above. The methods of preparing the highly dispersed supported Group VIII metal-arsenic compounds and Group VIII metal-phosphorus compounds are exactly parallel except for the utilization of the different non-metals, i.e. arsenic vs. phosphorus.

In the case of the highly dispersed supported Group VIII metal-phosphorus compounds the method of preparation is as follows.

A method of preparing highly dispersed Group VIII metal-phosphorus compounds supported on a high surface area support selected from the group consisting of carbon, alumina, silica, silica-alumina, zeolite, kieselguhr, vermiculite, the refractory oxides of Group IVb and Vb, transition metals, and mixtures thereof, wherein the process comprises the steps of: (a) impregnating said high surface area support with a solution of one or more water soluble Group VIII metal salts; (b) impregnating said support with phosphorus by means of a phosphorus source selected from the group consisting of elemental phosphorus and a water soluble phosphorus salt wherein steps (a) and (b) may be performed simultaneously or sequentially in any order; (c) reducing the composition resultant from the completion of steps (a) and (b) at a temperature in the range of about 200° C. to about 650° C. for a time sufficient to generate the desired amount of highly dispersed, supported Group VIII metal-phosphorus compounds.

The highly dispersed, supported Group VIII metal-arsenic compounds are prepared in exactly the same manner except that step (b), above, would comprise impregnating said support with arsenic by means of an arsenic source selected from the group consisting of elemental arsenic and a water soluble arsenic salt.

Impregnating the high surface area support with the solution of the water soluble Group VIII metal salt and the selected source of phosphorus or arsenic may be achieved by those methods presently known in the art. For example, the solutions of the water soluble salts may be impregnated on the support chosen by incipient wetness techniques, ion exchange method, etc. It should be noted that when utilizing the ion exchange technique the removal of a substantial portion of phosphorus present prior to the ion exchange technique may occur. This will occur when an acid is utilized to form exchange sites for the Group VIII metal compound. If an acid is to be so utilized it is preferable to deposit the metal by this technique prior to the deposition of the phosphorus. Otherwise, the addition of some phosphorus may be required to enhance the performance of the process. However, acid is not the only chemical capable of forming the exchange sites. Other chemical species may be utilized that do not cause the substantial removal of the phosphorus present before the utilization of the ion exchange technique.

On the other hand, the support may be impregnated with elemental phosphorus or arsenic, for example, by the vapor deposition of the elemental phosphorus or arsenic in a vacuum. If the vapor deposition of the nonmetallic component is performed in a non-inert atmosphere, e.g. an atmosphere containing oxygen, one must reduce the deposited composition to obtain the elemental form, i.e. phosphorus or arsenic, if so desired. The phosphorus that is preferred in this technique of vapor deposition is red phosphorus. Another method of depositing phosphorus may be achieved by decomposing $PH_3$ vapor on the support in an inert atmosphere. This technique will deposit the support with phosphorus in its elemental form.

As is noted above, the impregnation of the non-metallic source and the water soluble Group VIII metal salt, wherein the metal salt is impregnated from a solution thereof, may be performed either simultaneously or sequentially in any order. Thus, for example, a solution of a water soluble Group VIII metal salt and a solution of a water soluble phosphate salt may be simultaneously impregnated onto the support by either the simultaneous deposition of each separate solution or the single deposition of a mixture of these two solutions subsequent to combining them. Simultaneous impregnation is not possible, however, when utilizing the vapor deposition techniques for depositing the nonmetal in its elemental form. The high temperature required to vaporize the nonmetal in this technique would also vaporize the solution of water soluble Group VIII metal salts utilized to impregnate the support with the metal salt. Since the impregnation of the metal salt requires that the metal salt be impregnated from solution, it would not be possible to simultaneous vapor deposit the nonmetal in its elemental form and impregnate the support with the metal salt while maintaining the high degree of metal dispersion desired.

As noted above, the composition resulting from the completion of steps (a) and (b) must be reduced prior to obtaining the highly dispersed, supported Group VIII metal-phosphorus or Group VIII metal-arsenic compounds. Any reduction technique compatible with the reduction of solid materials may be utilized in the practice of the instant invention. A preferred method of reduction comprises reducing the composition resulting from the completion of steps (a) and (b) in a reducing atmosphere, e.g. $H_2$, at a temperature in the range of about 200° C. to about 650° C., preferably from about 350° C. to about 500° C. The method of reduction is preferable since it combines the reduction step and heating step of the instant process. Since it is preferable that the Group VIII metal component and phosphorus (or arsenic) be present in their elemental forms during the heating step, so that the Group VIII metal and phosphorus (or arsenic) form the corresponding Group VIII metal-nonmetal compounds during the heating step, a reduction step using a reducing gas at the above temperature range both reduces the components and causes the formation of the desired Group VIII metal-nonmetal catalyst. Any reduction that may be run at the above temperature range can be substituted for the reducing gas reduction technique as long as the reduction step does not remove the metal or nonmetal component deposited by the earlier steps.

Any method of reduction comprising a reduction with a solution at ambient temperatures may also be utilized in place of a reduction at the higher temperatures. Normally, this will add additional steps to the process, since the final step is a reduction performed at elevated temperatures. Those skilled in the art will be able to select those reduction solutions that may be utilized in conjunction with the instant invention. Again, the only criteria for the selection of the reduction technique, other than the solution's ability to reduce the component or components in question, is that the reduction technique does not remove the metal or nonmetal component deposited by the earlier steps. The duration of the reduction-heating step depends primarily upon three parameters: (1) the temperature of the heating step; (2) the Group VIII metal-phosphorus compounds generated; and (3) the extent of Group VIII metal-phosphide conversion desired. Generally, heating the catalyst components in a reducing atmosphere from about 1 to about 6 hours, preferably from about 2 to about 4 hours will cause substantial generation of the highly dispersed, supported Group VIII metal-phosphorus compounds.

Normally, in the practice of the instant invention, the reduction step is performed in conjunction with the heating step. When the support is impregnated with both the water soluble Group VIII metal salt or salts and a water soluble nonmetal salt in the practice of the instant invention, the most practical method comprises a reduction step following the impregnation of both the metal and nonmetal component so that both the impregnated metal salt and nonmetal salt may be reduced simultaneously. One, however, is not limited in the practice of the instant invention to only one reduction step. When the support is separately impregnated with a metal salt and a nonmetal salt (in any order) as described above, it is possible to have two reduction steps—one after the impregnation of one salt and another reduction step after the impregnation of the other salt, which is generally performed in conjunction with the final heating step.

It should be further noted that in another embodiment of the instant invention the reduction step is not performed simultaneously with the heating step. This occurs when phosphorus is deposited by vapor deposition onto a support previously deposited with a Group VIII metal salt, which salt has been reduced prior to the phosphorus deposition. The vapor deposition must be performed in nonoxidizing atmosphere, otherwise a reduction step must follow. The temperature of such vapor deposition can range from about 200° C. to 500° C., preferably from about 300° C. to about 450° C. A highly dispersed, supported Group VIII metal-phosphorus compound is produced as a result of this vapor deposition step.

The highly dispersed, supported Group VIII metal-phosphorus compounds or Group VIII metal-arsenic compounds may be formed from any of the Group VIII metals, or mixtures thereof, namely, Fe, Co, Ni, Ru, Rh, Pd, Os, Ir, and Pt; preferably, the Group VIII noble metals, or mixtures thereof, namely, Ru, Rh, Pd, Os, Ir, Pt and mixtures thereof; most preferably, Pt. The metal is deposited on the support by impregnating the support with a solution of water soluble Group VIII metal salts by the techniques described above as well as other equivalent techniques presently known in the art. The impregnation of the metal salts from solution is crucial to producing a supported Group VIII metal-phosphorus compound or Group VIII metal-arsenic compound in a state of high dispersion. Although it is required that the Group VIII metal salts be water soluble, it is not necessary that the solution utilized in the impregnation technique be an aqueous solution. These water soluble salts may be used in conjunction with any solvent as long as the salt dissolves in the solvent, the solvent is inert to the support, the solute or any other component of the composition. Finally, the solution, i.e. the combination of the salt and solvent, must be inert to the support and any of its components. By inert, is meant that no chemical reaction will occur. One skilled in the art will be able to choose a solvent filling the above criteria. One type of solvent other than water which may be used is a low molecular weight alcohol, preferably methanol.

The Group VIII metal salts which may be utilized in the process of the instant invention are water soluble metal salts, e.g. Group VIII metal chloride, nitrate, or ammonia complexes, preferably, water soluble noble metal salts, e.g. noble metal chloride, nitrate and ammonia complexes, most preferably water soluble platinum salts, e.g. platinum chlorides, nitrates and ammonia complexes. Most preferably, the water soluble platinum salts are platinum chloride complexes.

As described above the source of phosphorus in the practice of the instant invention may be elemental phosphorus, e.g. deposited by vapor phase deposition, or a water soluble phosphorus salt, e.g. impregnating by the incipient wetness technique. An example of a water soluble phosphorus salt is ammonium phosphate which is also a preferred example. Again, as with the water soluble Group VIII metal salt, the actual impregnation need not utilize the water soluble phosphate salt in an aqueous solution. A solvent other than water may be utilized using the same criteria outlined above for the metal salt but substituting the solubility requirements, etc. of the water soluble phosphorus salt. Again one skilled in the art will be able to choose a solvent filling the criteria in question. One type of solvent which may be used is low molecular weight alcohols, preferably methanol.

Similarly, the course of arsenic in the practice of the instant invention may be elemental arsenic, e.g. deposited by vapor phase deposition or a water soluble arsenic salt, e.g. impregnating by the incipient wetness technique. An example of a water soluble arsenic salt is ammonium arsenite. Again, as with both the water soluble Group VIII metal salt and the water soluble metal salt, the actual impregnation need not utilize the water soluble arsenic salt in an aqueous solution. A solvent other than water may be utilized chosen by the criteria outlined above.

It should be noted that a specialized source of phosphorus may be utilized to impregnate the support when the support is carbon. The carbon may be impregnated with phosphorus by the utilization of phosphoric acid. This technique is employed commercially to activate carbon support material. Normally, the activated carbon contains about 2.5 to about 3.5 wt. % of phosphorus. Two examples of such commercially available "activated carbon" supports are North American Corporation's P-100 and American Norit's Polycarbon C.

As noted above, the highly dispersed Group VIII metal-phosphorus or Group VIII metal-arsenic compounds are supported on a high surface area solid support selected from the group consisting of carbon, alumina, silica, silicaalumina, zeolite, kieselguhr, vermiculite, and the refractory oxides of Group IVb and Vb transition metals, and mixtures thereof. Preferably, the supports are selected from the group consisting of carbon, silica, alumina, and silicaalumina and mixtures thereof. Most preferably, the support is carbon. A carbon support may be crystalline, i.e. graphite, or amorphous, preferably amorphous. Further, a carbon support may be activated or nonactivated, preferably activated. The surface areas of the supports may range from about 10 to about 2000 m²/g, preferably from about 40 to about 1500 m²/g.

It has also been unexpectedly discovered that a highly dispersed, supported Group VIII metal catalyst may be prepared utilizing either the highly dispersed, supported Group VIII metal-phosphorus compounds or the highly dispersed, supported Group VIII metal-arsenic compounds described above. This result is achieved by the decomposition of the Group VIII metal-phosphorus (or arsenic) compound without appreciably increasing the metal crystallite size. Two methods of accomplishing this result are: (1) low temperature calcination in air wherein the temperature may range from about 100° C. to about 300° C., preferably from about 200° C. to about 250° C.; and (2) decomposition with water. The decomposition in water comprises mixing the supported Group VIII metal-phosphorus (or arsenic) compound in water at any temperature below 100° C., preferably room temperature.

In utilizing the above process to obtain highly dispersed, supported Group VIII metal catalysts, the Group VIII metal crystallite sizes may range from about 100 Å to about 20 Å, preferably from about 50 Å to about 25 Å.

The following are specific embodiments which are meant to illustrate and not limit the instant invention.

EXAMPLE 1

In this example a water soluble platinum salt was impregnated by the incipient wetness technique on two separate high surface area carbon supports. Each of these carbon supports contained phosphorus (2.5~3.5 wt. %), which had been introduced into the support by the manufacturer during the phosphoric acid activation process. These supports were P-100 containing about 3.5 wt. % phosphorus, which is commercially available from North American Corp., and Polycarbon C containing about 2.5 wt. % phosphorus, which is commercially available from the American Norit Corp. Aqueous chloroplatinic acid was used as an impregnating medium, with sufficient solution to produce a uniform, moist catalyst mass during the impregnation step. About 10 wt. % Pt was deposited onto each of the carbon supports during the impregnation step.

Each moist catalyst mass was dried in air at 120° C., prior to reduction in a modified quartz tube furnace. Reduction was carried out for about 1.5 hours at 450° C. with a flowing de-oxygenated and dried hydrogen stream.

Small $PtP_2$ crystallites were detected by standard X-ray diffraction techniques. The data are shown in Table 1.

TABLE 1
PREPARATION OF HIGHLY
DISPERSED $PtP_2$ ON PHOSPHORUS

| Carbon Description | Carbon Surface Area BET, $m^2/g$ | Average $PtP_2$ Crystallite Size Determined by X-ray Diffraction - A |
|---|---|---|
| P-100 | 1400 | 50 |
| Polycarbon C | 1000 | 56 |

EXAMPLE 2

In Example 2, platinum is deposited on two non-activated carbon supports. One support is deposited with platinum utilizing the incipient wetness technique using aqueous chloroplatinic acid as described in Example 1. This composition was also reduced as described in Example 1. 9.3 wt. % of Pt was deposited on Graphon, a non-activated graphitized carbon support commercially available from the Cabot Corp.

On the second non-activated carbon support, Vulcan XC-72, carbon black also commercially available from the Cabot Corp., was deposited 3.5 wt. % Pt utilizing the ion exchange technique. Exchangeable sites were created on the carbons by treatment in stirred 13.5 N nitric acid solution at 80° C. for three hours. After filtration, the carbons were washed with deionized water until nitrate ion was absent in the wash liquid. They were dried at room temperature.

Platinum cation complex, $Pt(NH_3)_4Cl_2$, was used as the exchange agent. A basic solution of $Pt(NH_3)_4Cl_2$ was prepared by dissolving the salt in deionized water containing 2.2 N $NH_4OH$. The final solution contained 0.005 gm of Pt/cc. Twenty grams of Vulcan XC-72 were transferred into 420 cc of the above solution and stirred at room temperature for 48 hours.

The filtered, washed and dried composition was reduced as described in Example 1. These reduction conditions will also decompose the excess acid centers formed on the carbon during the nitric acid treatment.

Upon each of these Pt/carbon compositions was deposited elemental phosphorus by the vapor deposition method. Each of these carbon supported platinum catalysts was mixed with excess red phosphorus powder and sealed in vacuum ampoules. After heating the mixture for 5 hours at 430° C., the ampoules were opened and the samples were passivated slowly with air. $PtP_2$ crystallites were detected by standard X-ray diffraction techniques. The data are shown in Table 2.

TABLE 2
PREPARATION OF HIGHLY DISPERSED
$PtP_2$ BY VAPOR DISPOSITION OF
PHOSPHORUS ONTO CARBON SUPPORTED
Pt CATALYSTS

| Pt Catalysts | Average Pt Crystallite Size Determined before Phosphorus Deposition, A | Average $PtP_2$ Crystallite Size, A |
|---|---|---|
| 9.3 wt. % Pt/ Graphon | 70 | 90 |
| 3.5 wt. % Pt/ Vulcan XC-72 | 23 | 30 |

EXAMPLE 3

The highly dispersed $PtP_2$/P-100 and the highly dispersed $PtP_2$/Polycarbon C prepared in Example 1 was calcined in air at 220° C. for two hours to yield highly dispersed Pt/P-100 and Pt/Polycarbon C catalysts. The data is summarized in Table 3.

TABLE 3
PREPARATION OF HIGHLY DISPERSED Pt
ON PHOSPHORUS-CONTAINING
CARBON SUPPORTS

| Carbon Description | Carbon Surface Area BET, $m^2/g$ | Average $PtP_2$ Crystalline Size Determined by X-ray diffraction, A | Average Pt Crystallite Size for Calcined $PtP_2$ determined by X-ray diffraction, A |
|---|---|---|---|
| P-100 | 1400 | 50 | 34 |
| Polycarbon C | 1000 | 56 | 49 |

EXAMPLE 4

In Example 4, 10% platinum was deposited on P-100 as described in Example 1. The P-100 support contained 3.4 wt. % of phosphorus. The platinum salt deposited carbon catalyst was reduced under hydrogen at 450° C. for 1½ hours. X-ray diffraction determined that $PtP_2$ was present with an estimated crystallite size of 59 Å.

Low Temperature air calcination of the $PtP_2$/carbon catalyst at 220° C. for two hours, decomposed the $PtP_2$ producing Pt crystallite sizes of about 34 Å, as determined by X-ray diffraction. The $PtP_2$/carbon catalyst was mixed with enough water to make a dilute suspension at room temperature for two hours decomposing the $PtP_2$ producing Pt crystallite sizes of 27 Å, as determined by X-ray diffraction. Table 4 summarizes the data.

TABLE 4
DECOMPOSITION OF $PtP_2$ SUPPORTED
ON P-100 TO YIELD HIGHLY
DISPERSED Pt/P-100

| Catalyst | Step | Environment | Temperature | Crystallite Phase by X-ray Diffraction | Particle Size A |
|---|---|---|---|---|---|
| 10% Pt/P-100 | 1 | $H_2$ | 450° C. | $PtP_2$ | 59 |
| | 2 | Air | 220° C. | Pt | 34 |
| 10% Pt/P-100 | 1 | $H_2$ | 450° C. | $PtP_2$ | 59 |

TABLE 4-continued

DECOMPOSITION OF PtP$_2$ SUPPORTED ON P-100 TO YIELD HIGHLY DISPERSED Pt/P-100

| Catalyst | Step | Environment | Temperature | Crystallite Phase by X-ray Diffraction | Particle Size Å |
|---|---|---|---|---|---|
| | 2 | Water | 25° C. | Pt | 27 |

What is claimed is:

1. A method for preparing Group VIII metal-phosphorus compounds supported on a high surface area solid support selected from the group consisting of carbon, alumina, silica, silica-alumina, zeolite, kieselguhr, vermiculite, the refractory oxides of Group IVb and Vb transition metals and mixtures thereof, wherein the Group VIII metal-phosphorus crystallite size is about 300 Å or less, wherein the process consists of the steps of:
   (a) impregnating said high surface area support with a solution of at least one water soluble Group VIII metal salt selected from the group consisting of water soluble Group VIII metal chloride, Group VIII metal nitrate and Group VIII metal ammonia complexes;
   (b) impregnating said support with phosphorus by means of a phosphorus source selected from the group consisting of elemental phosphorus and at least one water soluble phosphate salt, in an amount sufficient to resalt in a phosphorus to Group VIII metal atomic ratio of about 0.3 to about 3.0;
   (c) reducing the reducible deposited components resultant from the completion of steps (a) and (b) in a gaseous reducing atmosphere at a temperature in the range of about 200° C. to about 650° C. for a time sufficient to generate the desired supported Group VIII metal-phosphorus compounds.

2. The method of claim 1 wherein said solution of at least one water soluble Group VIII metal salt is an aqueous solution.

3. The method of claim 2 wherein said support is impregnated with said solution of at least one water soluble Group VIII metal salt by the incipient wetness technique.

4. The method of claim 2 wherein said support is impregnated with said solution of at least one water soluble Group VIII metal salt by the ion exchange method, wherein steps (a) and (b) are performed sequentially, step (a) first, followed by step (b).

5. The method of claim 1 wherein said water soluble Group VIII metal salts are selected from the group consisting of water soluble Group VIII noble metal chloride, Group VIII noble metal nitrate and Group VIII noble metal ammonia complexes.

6. The method of claim 5 wherein said water soluble Group VIII metal salts are selected from the group consisting of water soluble platinum chloride, platinum nitrate and platinum ammonia complexes.

7. The method of claim 1 wherein said high surface area support is selected from the group consisting of carbon, alumina, silica, silica-alumina, and mixtures thereof and the surface area of said support ranges from about 10 to about 2000 m$^2$/g.

8. The method of claim 7 wherein said high surface area support is carbon.

9. The method of claim 8 wherein said water soluble Group VIII metal salt is H$_2$PtCl$_6$ and said solution of H$_2$PtCl$_6$ is an aqueous solution.

10. The method of claim 9 wherein said water soluble phosphate salt is ammonium phosphate and said solution of ammonium phosphate is an aqueous solution.

11. The method of claim 10 wherein steps (a) and (b) are performed sequentially, step (a) first followed by step (b) and after step (a) the composition resultant from step (a) is reduced, and the temperature of said reducing step (c) ranges from about 300° C. to about 500° C.

12. The method of claim 10 wherein steps (a) and (b) are performed sequentially, step (b) first followed by step (a), and after step (b) the composition resultant from step (b) is reduced, and the temperature of said reducing step (c) ranges from about 300° C. to about 500° C.

13. The method of claim 9 wherein steps (a) and (b) are performed sequentially in any order and said support is impregnated with phosphorus by the vapor deposition method in a vacuum.

14. The method of claim 13 wherein said support is impregnated with red phosphorus.

15. The process of claim 1 wherein said reducing atmosphere is H$_2$ and said temperature ranges from about 300° C. to about 500° C.

16. The method of claim 1 wherein the impregnating steps (a) and (b) are practiced sequentially, in any order.

17. The method of claim 1 wherein the impregnating steps (a) and (b) are practiced simultaneously.

18. A method for preparing Group VIII metal-phosphorus compounds supported on a high surface area solid carbon support, wherein the Group VIII metal-phosphorus crystallite size is about 300 Å or less, wherein the process consists of the steps of:
   (a) impregnating said high surface area carbon support with a solution of at least one water soluble Group VIII metal salt selected from the group consisting of Group VIII metal chlorides, Group VIII metal nitrates and Group VIII metal ammonia complexes;
   (b) impregnating said carbon support with phosphoric acid in an amount sufficient to result in a phosphorus to Group VIII metal atomic ratio of about 0.3 to about 3.0;
   (c) reducing the reducible deposited components resultant from the completion of steps (a) and (b) in a gaseous reducing atmosphere at a temperature in the range of about 200° C. to about 650° C. for a time sufficient to generate the supported Group VIII metal-phosphorus compounds.

19. The method of claim 18 wherein said water soluble Group VIII metal salts are selected from the group consisting of water soluble platinum chloride, platinum nitrate and platinum ammonia complexes.

20. The method of claim 19 wherein said water soluble Group VIII metal salt is H$_2$PtCl$_6$ and said solution of H$_2$PtCl$_6$ is an aqueous solution.

21. The method of claim 20 wherein steps (a) and (b) are performed sequentially, step (a) first followed by step (b), and after step (a) the composition resultant from step (a) is reduced, and the temperature of said reducing step (c) ranges from about 300° C. to about 500° C.

22. The method of claim 20 wherein steps (a) and (b) are performed sequentially, step (b) first followed by step (a), and after step (b) the composition resultant from step (b) is reduced, and the temperature of said reducing step (c) ranges from about 300° C. to about 500° C.

23. A method for preparing Group VIII metal-phosphorus compounds supported on a high surface area solid support selected from the group consisting of carbon, alumina, silica, silica-alumina, zeolite, kieselguhr, vermiculite, the refractory oxides of Group IVb and Vb transition metals and mixtures thereof wherein said support contains a chemical species selected from the group consisting of a reducible phosphorus-containing compound and elemental phosphorus, wherein the Group VIII metal-phosphorus crystallite size is about 300 Å or less wherein the process consists of the steps of:
  (a) impregnating said high surface area support with a solution of at least one water soluble Group VIII metal salt selected from the group consisting of Group VIII metal chlorides, Group VIII metal nitrates and Group VIII metal ammonia complexes;
  (b) reducing the composition resultant from the completion of step (a) in a gaseous reducing atmosphere at a temperature in the range of about 200° C. to about 650° C. for a time sufficient to generate the desired supported Group VIII metal-phosphorus compounds.

24. The method of claim 23 wherein said water soluble Group VIII metal salts are selected from the group consisting of water soluble platinum chloride, platinum nitrate and platinum-ammonia complexes.

25. The method of claim 24 wherein said high surface area support is activated carbon.

26. The method of claim 25 wherein said water soluble Group VIII metal salt is $H_2PtCl_6$ and said solution of $H_2PtCl_6$ is an aqueous solution.

27. A method for preparing a Group VIII metal-arsenic compound supported on a high surface area support selected from the group consisting of carbon, alumina, silica, silica-alumina, zeolite, kieselguhr, vermiculite, the refractory oxides of Group IVb and Vb transition metals, and mixtures thereof wherein the Group VIII metal-arsenic compound has a crystallite size of about 300 A or less, wherein the process consists of the steps of:
  (a) impregnating said high surface area support with a solution of at least one water soluble Group VIII metal salt selected from the group consisting of Group VIII metal chlorides, Group VIII metal nitrates and Group VIII metal ammonia complexes;
  (b) impregnating said support with a chemical species selected from the group consisting of arsenic and a water soluble arsenite salt in an amount sufficient to result in an arsenic to Group VIII metal atomic ratio of about 0.3 to about 3.0;
  (c) reducing the reducible deposited components resultant from the completion of steps (a) and (b) in a gaseous reducing atmosphere at a temperature in the range of about 200° C. to about 650° C. for a time sufficient to generate the desired supported Group VIII metal-arsenic compounds. pg,38

28. A process for preparing Group VIII metals supported on a high surface area solid support selected from the group consisting of carbon, alumina, silica, silica-alumina, zeolite, kieselguhr, vermiculite, the refractory oxides of Group IVb and Vb transition metals and mixtures thereof, wherein the Group VIII metals crystallite size is about 300 Å or less, wherein the process consists of the steps of:
  (a) impregnating said high surface area support with solution of at least one water soluble Group VIII metal salt selected from the group consisting of Group VIII metal chlorides, Group VIII metal nitrates and Group VIII metal ammonia complexes;
  (b) impregnating said support with phosphorus by means of a phosphorus source selected from the group consisting of elemental phosphorus and at least one water soluble phosphate salt;
  (c) reducing the reducible deposited components resultant from the completion of steps (a) and (b) in a gaseous reducing atmosphere at a temperature in the range of about 200° C. to about 650° C. for a time sufficient to generate a supported Group VIII metal-phosphorus compound having a crystallite size of about 300 Å or less;
  (d) decomposing said Group VIII metal-phosphorus compound such that the Group VIII metal crystallite size is not substantially increased, and the supported Group VIII metal is formed.

29. The process of claim 28 wherein said Group VIII metal-phosphorus compound is decomposed by calcining in air said highly dispersed, supported Group VIII metal-phosphorus compound at a temperature in the range of from about 100° C. to about 300° C.

30. The process of claim 28 wherein said Group VIII metal-phosphorus compound is decomposed by decomposing said highly dispersed, supported Group VIII metal-phosphorus compound in water at room temperature.

31. The process of claim 29 wherein said Group VIII metal salt is $H_2PtCl_6$, said support is carbon, said solution of $H_2PtCl_6$ is an aqueous solution and said highly dispersed, supported Group VIII metal-phosphorus compound is $PtP_2$.

32. The process of claim 30 wherein said Group VIII metal salt is $H_2PtCl_6$, said support is carbon, said solution of $H_2PtCl_6$ is an aqueous solution and said highly dispersed, supported Group VIII metal-phosphorus compound is $PtP_2$.

33. The method of claim 18 wherein the impregnating steps (a) and (b) are practiced sequentially, in any order.

34. The method of claim 18 wherein the impregnating steps (a) and (b) are practiced simultaneously.

35. The method of claim 27 wherein the impregnating steps (a) and (b) are practiced sequentially, in any order.

36. The method of claim 27 wherein the impregnating steps (a) and (b) are practiced simultaneously.

37. The method of claim 28 wherein the impregnating steps (a) and (b) are practiced sequentially, in any order.

38. The method of claim 28 wherein the impregnating step (a) and (b) are practiced simultaneously.

39. A method for preparing a Group VIII metal-phosphorus compound supported on a high surface area solid support selected from the group consisting of carbon, alumina, silica, silica-alumina, zeolite, kieselguhr, vermiculite, the refractory oxides of Group IVb and Vb transition metals and mixtures thereof, wherein the Group VIII metal-phosphorus compound has a crystallite size of about 300 A or less, wherein the process consists of the steps of:
  (a) impregnating said high surface area support with a solution of at least one water soluble Group VIII metal salt selected from the group consisting of Group VIII metal chlorides, Group VIII metal nitrates and Group VIII metal ammonia complexes;
(b) reducing the supported Group VIII metal salt of (a) to a supported Group VIII metal at a temperature in the range of about 200° to about 650° C.; and
(c) impregnating the material of step (b) with phosphorus by means of the vapor deposition method in a vacuum.

40. The method of claim 39 wherein the water soluble Group VIII metal salts are selected from the group consisting of water soluble Group VIII noble metal chlorides, Group VIII noble metal nitrates and Group VIII noble metal ammonia complexes.

41. The method of claim 39 wherein the Group VIII noble metal salts are selected from the group consisting of platinum chloride, platinum nitrate and platinum ammonia complexes.

42. The method of claim 39 wherein the support is selected from the group consisting of carbon, alumina, silica-alumina and mixtures thereof and the surface area of the support ranges from about 10 to about 2000 m$^2$/g.

43. The method of claim 42 wherein the support is carbon.

44. The method of claim 39 wherein the phosphorus deposited by the vapor deposition method is red phosphorus.

* * * * *